(12) United States Patent
Garvey et al.

(10) Patent No.: US 12,492,977 B2
(45) Date of Patent: Dec. 9, 2025

(54) SYSTEM AND METHOD FOR TESTING

(71) Applicant: ROLLS-ROYCE plc, London (GB)

(72) Inventors: Seamus D Garvey, Nottingham (GB); Christopher J Bennett, Nottingham (GB); David Hills, Oxford (GB); James Rouse, Nottingham (GB)

(73) Assignee: ROLLS-ROYCE PLC, London (GB)

( * ) Notice: Subject to any disclaimer, the term of this patent is extended or adjusted under 35 U.S.C. 154(b) by 531 days.

(21) Appl. No.: 18/169,932

(22) Filed: Feb. 16, 2023

(65) Prior Publication Data
US 2023/0280252 A1 Sep. 7, 2023

(30) Foreign Application Priority Data

Mar. 7, 2022 (GB) .................................... 2203102

(51) Int. Cl.
*G01N 3/36* (2006.01)
*G01M 7/00* (2006.01)
(Continued)

(52) U.S. Cl.
CPC ....... *G01N 3/36* (2013.01); *G01N 2203/0005* (2013.01); *G01N 2203/0044* (2013.01); *G01N 2203/0048* (2013.01)

(58) Field of Classification Search
CPC ............. G01N 3/36; G01N 2203/0005; G01N 2203/0044; G01N 2203/0048; G01N 3/08;
(Continued)

(56) References Cited

U.S. PATENT DOCUMENTS

| 5,343,752 A | 9/1994 | Woyski et al. |
| 5,544,528 A | 8/1996 | Woyski et al. |

(Continued)

FOREIGN PATENT DOCUMENTS

| CN | 202256065 U | 5/2012 | |
| CN | 203811364 U | 9/2014 | |
| CN | 114136877 A | 3/2022 | |
| EP | 0 277 458 A1 | 8/1988 | |
| JP | 3260756 B2 | 2/2002 | |
| WO | WO-2006034929 A1 * | 4/2006 | ............... G01N 3/56 |

OTHER PUBLICATIONS

Jun. 17, 2022 Search Report issued in British Patent Application No. 2203102.5.
(Continued)

*Primary Examiner* — Brandi N Hopkins
(74) *Attorney, Agent, or Firm* — Oliff PLC

(57) ABSTRACT

A system for testing at least one test piece. The system includes a pressure vessel including a first chamber receiving a first fluid at a first pressure. The pressure vessel further includes a second chamber receiving a second fluid. The pressure vessel further includes an actuating membrane fluidly separating the first chamber from the second chamber. The system further includes a test vessel including an internal chamber disposed in fluid communication with the second chamber. The test vessel further includes at least one test wall coupled to the at least one test piece. The system further includes an actuator engaged with the actuating membrane and configured to apply a time-varying force on the actuating membrane while the first pressure is being applied by the first fluid on the actuating membrane.

20 Claims, 5 Drawing Sheets

(51) Int. Cl.
*G01M 13/00* (2019.01)
*G01M 15/02* (2006.01)

(58) Field of Classification Search
CPC ........ G01N 3/04; G01N 17/008; G01N 19/04; G01M 7/00; G01M 3/2884; G01M 7/02; G01M 7/022; G01M 13/027; G01L 9/0016; G01L 21/02; G01L 27/002; G01L 1/20; G01R 1/0735; A61M 5/14224; F04B 43/073; F04B 11/0016; G01F 1/72; G05D 7/0635
USPC ............................................................ 73/37
See application file for complete search history.

(56) References Cited

U.S. PATENT DOCUMENTS

| | | | |
|---|---|---|---|
| 5,665,919 | A | 9/1997 | Woyski et al. |
| 2013/0195729 | A1* | 8/2013 | Woodall .................... C01B 3/08 |
| | | | 422/162 |
| 2017/0074258 | A1 | 3/2017 | Amirouche et al. |

OTHER PUBLICATIONS

Aug. 7, 2023 Extended Search Report issued in European Patent Application No. 23156771.0.

* cited by examiner

SYSTEM AND METHOD FOR TESTING

FIELD OF THE DISCLOSURE

The present disclosure relates to a system and a method for testing at least one test piece.

BACKGROUND

Mechanical components are typically used in various devices, such as internal combustion engines, gas turbine engines, motors, compressors, pumps, and the like. In gas turbine engines, mechanical components may include shafts, rotor blades, stator vanes, couplings, disks, and so on. During operation of such devices (e.g., the gas turbine engine), mechanical components are usually subjected to high mechanical and thermal loads. Further, the mechanical components are subjected to loads that impose a substantially steady force as well as a high-frequency alternating force (i.e., a time-varying force) during their operation. Therefore, it is important to evaluate or test a mechanical integrity and a durability of such mechanical components to determine a service life and a strength of these components.

Service representative conditions are required to be imposed on such mechanical components for testing their mechanical integrity. Such conditions may include the substantially steady force (e.g., a higher magnitude steady force) as well as the high-frequency alternating force (e.g., a lower magnitude alternating force). Various testing devices are currently available to impose such conditions on the mechanical components. Some testing devices utilize a hydraulic actuation system for applying the high magnitude steady force on the mechanical component to be tested. However, the hydraulic actuation system may not be suitable for imposing the high frequency alternating force on the mechanical component to be tested.

Some testing devices use a piezo-electric actuation system. The piezo-electric actuation system typically includes a piezo-electric actuator that converts electrical energy into mechanical displacement based on piezo-electric effect, or vice versa. The piezo-electric actuation system may be suitable for imposing the high frequency alternating force on the mechanical component. However, the piezo-electric actuator of the piezo electric actuation system may characteristically provide only small mechanical displacements for testing of the mechanical component. For instance, the piezo-electric actuation system may be suitable for cases where the mechanical component is required to be tested only for small alternating displacements. However, the piezo-electric actuation system may be unsuitable for applying a constant force having a large magnitude on the mechanical component.

Hence, a system for testing the integrity of mechanical components is required which overcomes the above-mentioned problems.

SUMMARY

According to a first aspect, there is provided a system for testing at least one test piece. The system includes a pressure vessel. The pressure vessel includes a first chamber receiving a first fluid at a first pressure. The pressure vessel further includes a second chamber fluidly separated from the first chamber and receiving a second fluid. The pressure vessel further includes an actuating membrane fluidly separating the first chamber from the second chamber. The actuating membrane is configured to apply a second pressure on the second fluid within the second chamber in response to the application of the first pressure by the first fluid on the actuating membrane. The system further includes a test vessel including an internal chamber disposed in fluid communication with the second chamber and at least one test wall defining at least one boundary of the internal chamber. The at least one test wall is coupled to the at least one test piece. The internal chamber is configured to receive the second fluid at the second pressure. The at least one test wall is configured to apply a first force on the at least one test piece in response to the application of the second pressure by the second fluid on the at least one test wall. The system further includes an actuator engaged with the actuating membrane and configured to apply a time-varying force on the actuating membrane while the first pressure is being applied by the first fluid on the actuating membrane. The at least one test wall is further configured to apply a second force on the at least one test piece in addition to the first force in response to the application of the time-varying force by the actuator on the actuating membrane. The second force is time-varying and is different from the first force.

For testing the at least one test piece, the at least one test wall of the system may apply the first force as well as the second force on the at least one test piece. As the first force is applied in response to the application of the second pressure by the second fluid on the at least one test wall, the first force may be a steady force (e.g., a hydraulic force). The first force may provide a large steady force required for testing the at least one test piece.

The at least one test wall is configured to apply the second force on the at least one test piece in response to the application of the time-varying force by the actuator on the actuating membrane. As the second force is applied in response to the application of the time-varying force, the second force may be an alternating force required for testing the at least one test piece. Thus, the at least one test wall may be configured to apply the steady force (i.e., the first force) as well as the alternating force (i.e., the second force) on the at least one test piece for testing the at least one test piece. Hence, the system of the present disclosure may be configured to apply the alternating force in addition to the steady force on the at least one test piece for testing the at least one test piece.

Generally, in real time operations involving the use of the at least one test piece, the at least one test piece may be subjected to various loads generated by steady forces as well as alternating forces (i.e., time-varying forces). Such forces may correspond to service representative conditions of the at least one test piece. The system of the present disclosure may enable the application of the steady force and the alternating force on the at least one test piece. Thus, the system may be used for testing a durability and a mechanical integrity of the at least one test piece as the system can replicate the service representative conditions of the at least one test piece.

As compared to conventional techniques for testing the mechanical integrity of a test piece by applying only a hydraulic force, the system of the present disclosure may utilize a single setup for applying both the steady force (i.e., the first force) as well as the alternating force (i.e., the second force). In other words, the system uses the single setup for generating and imposing the service representative conditions on the at least one test piece. Thus, the system of the present disclosure may be able to accurately determine the durability and the mechanical integrity of the at least one test piece.

Further, by imposing the service representative conditions on the at least one test piece, a service life of the at least one test piece may be determined. This may further help in predicting a time for next inspection of the at least one test piece after the at least one test piece is put into service.

In some embodiments, the actuator includes a mass coupled to the actuating membrane. The actuator further includes an electromagnetic actuation device disposed proximal to the mass and configured to apply a time-varying actuating force on the mass, such that the mass oscillates relative to the pressure vessel to apply the time-varying force on the actuating membrane. The electromagnetic actuation device may include a magnetic field assembly and a coil winding. The electromagnetic actuation device uses a flow of current to oscillate the mass relative to the pressure vessel. Therefore, the electromagnetic actuation device is configured to apply the time-varying force on the actuating membrane. The time-varying force on the actuating membrane further leads to application of the second force on the at least one test piece required for testing the mechanical integrity of the at least one test piece.

In some embodiments, the actuator further includes a spring coupling the mass to the actuating membrane. By using the spring to couple the mass to the actuating membrane, the time-varying force is applied on the actuating membrane as a result of the oscillation of the mass.

In some embodiments, the spring includes a mechanical spring. Use of the mechanical spring may allow generation of the time-varying force on the actuating membrane.

In some embodiments, the spring includes a spring membrane disposed in the first chamber and an enclosed fluid disposed between the spring membrane and the actuating membrane. The spring membrane may be coupled to the mass. Use of the spring membrane and the enclosed fluid may allow generation of the time-varying force on the actuating membrane.

In some embodiments, the electromagnetic actuation device is further configured to apply the time-varying actuating force on the mass at a predetermined frequency. The predetermined frequency is equal to a natural frequency of a combination of the mass and the spring. As the predetermined frequency is equal to the natural frequency of the combination of the mass and the spring, the mass and the spring may oscillate at resonance. As a result, small oscillations of the mass may transform into a greater value of the time-varying force applied on the actuating membrane along with large displacements of the actuating membrane. As compared to a conventional piezo electric actuation system for testing the mechanical integrity of a test piece, the actuator of the proposed system may apply the alternating force (i.e., the second force) on the at least one test piece with small displacements as well as large displacements of the actuating membrane and/or the at least one test piece. The service representative conditions imposed on the at least one test piece may include small displacements as well as large displacements of the at least one test piece.

In some embodiments, the electromagnetic actuation device is a direct current linear actuator. Use of the direct current linear actuator may enhance an application of the time-varying actuating force on the mass.

In some embodiments, the first fluid is a gas, and the second fluid is a hydraulic fluid. Thus, the internal chamber of the test vessel may be hydraulically coupled with the second chamber of the pressure vessel. The hydraulic fluid may provide a stiff coupling between the test vessel and the second chamber as little energy is stored and released (due to incompressibility of the hydraulic fluid) as a pressure of the hydraulic fluid changes. As the second fluid is the hydraulic fluid, the at least one test wall is configured to apply a hydraulic force (i.e., the first force) on the at least one test piece in response to the application of the second pressure by the hydraulic fluid on the at least one test wall.

In some embodiments, the test vessel further includes an enclosing wall at least partially defining the internal chamber. The at least one test wall includes an elastic disc having a central portion and a circumferential portion fixedly coupled to the enclosing wall. The central portion is coupled to the at least one test piece and is configured to apply the first force and the second force on the at least one test piece. In some examples, the test vessel may be a hydraulic cylinder. The internal chamber defined by the hydraulic cylinder is configured to apply the steady force (i.e., the first force) and the alternating force (i.e., the second force) on the at least one test piece through the at least one test wall. Therefore, the coupling of the circumferential portion of the at least one test wall with the enclosing wall may enhance the application of the steady force (i.e., the first force) and the alternating force (i.e., the second force) on the at least one test piece.

In some embodiments, the test vessel includes a first end and a second end opposite to the first end. The enclosing wall extends between the first end and the second end. A length of the enclosing wall extending between the first end and the second end may be based on application requirements.

In some embodiments, the at least one test wall includes a first test wall defining a boundary of the internal chamber at the first end of the test vessel and a second test wall opposing the first test wall and defining a boundary of the internal chamber at the second end of the test vessel. The second fluid is configured to apply the second pressure on each of the first test wall and the second test wall. Thus, the second fluid may thereby apply the second pressure on each of the first and second test walls.

In some embodiments, the at least one test piece includes a first test piece and a second test piece. The first test wall is coupled to the first test piece and configured to apply the first force and the second force on the first test piece. The second test wall is coupled to the second test piece and configured to apply the first force and the second force on the second test piece.

Therefore, for testing the first test piece, the first test wall is configured to apply the steady force (i.e., the first force) as well as the alternating force (i.e., the second force) on the first test piece. Further, for testing the second test piece, the second test wall is configured to apply the steady force (i.e., the first force) as well as the alternating force (i.e., the second force) on the second test piece. Thus, the system of the present disclosure may be configured to test the mechanical integrity of two test pieces (the first test piece and the second test piece) simultaneously. In other words, the system of the present disclosure may impose the service representative conditions on each of the first test piece and the second test piece.

In some embodiments, the first force is substantially constant. In some examples, the first force (a substantially constant force) may be a large steady force required for testing the at least one test piece.

In some embodiments, the second force is an oscillating force having an amplitude. A magnitude of the first force is greater than the amplitude of the second force by a factor of at least 10. The application of the steady force (i.e., the first force) with a relatively larger magnitude and the oscillating force (i.e., the second force) with a relatively smaller magnitude may precisely impose the service representative conditions on the at least one test piece for its testing.

In some embodiments, the system further includes a conduit fluidly communicating the second chamber with the internal chamber. The conduit may provide a means for transferring the second pressure from the second chamber of the pressure vessel to the internal chamber of the test vessel in order to apply the first force (i.e., the steady force) and the second force (i.e., the alternating force) on the at least one test piece.

According to a second aspect there is provided a method of testing at least one test piece. The method includes a step of providing a pressure vessel. The pressure vessel includes a first chamber and a second chamber fluidly separated from the first chamber by an actuating membrane. The method further includes a step of receiving a first fluid within the first chamber at a first pressure. The method further includes a step of receiving a second fluid within the second chamber. The method further includes a step of applying a first pressure, via the first fluid, on the actuating membrane. The method further includes a step of applying, via the actuating membrane, a second pressure on the second fluid within the second chamber in response to the application of the first pressure. The method further includes a step of receiving the second fluid at the second pressure within an internal chamber of a test vessel. The internal chamber is disposed in fluid communication with the second chamber. The test vessel includes at least one test wall defining at least one boundary of the internal chamber. The method further includes a step of coupling the at least one test piece to the at least one test wall. The method further includes a step of applying, via the second fluid, the second pressure on the at least one test wall. The method further includes a step of applying, via the at least one test wall, a first force on the at least one test piece in response to the application of the second pressure on the at least one test wall. The method further includes a step of applying, via an actuator, a time-varying force on the actuating membrane while the first pressure is being applied by the first fluid on the actuating membrane. The method further includes a step of applying, via the at least one test wall, a second force on the at least one test piece in addition to the first force in response to the application of the time-varying force on the actuating membrane. The second force is time-varying and is different from the first force.

In some embodiments, applying the time-varying force on the actuating membrane further includes applying, via an electromagnetic actuation device, a time-varying actuating force on a mass coupled to the actuating membrane. Applying the me-varying force on the actuating membrane further includes oscillating the mass relative to the pressure vessel to apply the time-varying force on the actuating membrane. The electromagnetic actuation device is configured to apply the time-varying force on the actuating membrane. The time-varying force on the actuating membrane further leads to application of the second force on the at least one test piece.

In some embodiments, the method further includes coupling, via a spring, the mass to the actuating membrane. By using the spring to couple the mass to the actuating membrane, the time-varying force can be applied on the actuating membrane as a result of the time-varying actuating force applied on the mass.

In some embodiments according to the method of the second aspect, the time-varying actuating force is applied on the mass at a predetermined frequency. The predetermined frequency is equal to a natural frequency of a combination of the mass and the spring. As a result, the method includes application of the time-varying force on the actuating membrane along with large displacements of the actuating membrane in response to a relatively small amount of the time-varying actuating force applied on the mass.

In some embodiments according to the method of the second aspect, the at least one test wall includes an elastic disc including a central portion. Coupling the at least one test piece to the at least one test wall further includes coupling the at least one test piece to the central portion of the elastic disc, such that the central portion of the elastic disc applies the first force and the second force on the at least one test piece. Coupling of the at least one test wall to the at least one test piece may enable application of the steady force (i.e., the first force) and the alternating force (i.e., the second force) on the at least one test piece.

In some embodiments according to the method of the second aspect, the at least one test wall includes a first test wall defining a boundary of the internal chamber at a first end of the test vessel and a second test wall opposing the first test wall and defining a boundary of the internal chamber at a second end of the test vessel. Applying the second pressure further includes applying the second pressure on each of the first test wall and the second test wall. Thus, the method of the present disclosure may enable application of the second pressure on each of the first test wall and the second test wall simultaneously.

In some embodiments according to the method of the second aspect, the at least one test piece includes a first test piece and a second test piece. Coupling the at least one test piece further includes coupling the first test piece to the first test wall, such that the first test wall applies the first force and the second force on the first test piece. Coupling the at least one test piece further includes coupling the second test piece to the second test wall, such that the second test wall applies the first force and the second force on the second test piece. The method of the present disclosure may enable testing of the mechanical integrity of two test pieces (the first test piece and the second test piece) simultaneously. In other words, the method of the present disclosure may impose the service representative conditions on each of the first test piece and the second test piece.

In some embodiments according to the method of the second aspect, the first force is substantially constant. In some examples, the first force (a substantially constant force) may be a large steady force required for testing the at least one test piece.

In some embodiments according to the method of the second aspect, the second force is an oscillating force having an amplitude. A magnitude of the first force is greater than the amplitude of the second force by a factor of at least 10. By the application of the steady force (i.e., the first force) with a relatively larger magnitude and the oscillating force (i.e., the second force) with a relatively smaller magnitude, the method of the present disclosure may precisely impose the service representative conditions on the at least one test piece for its testing.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
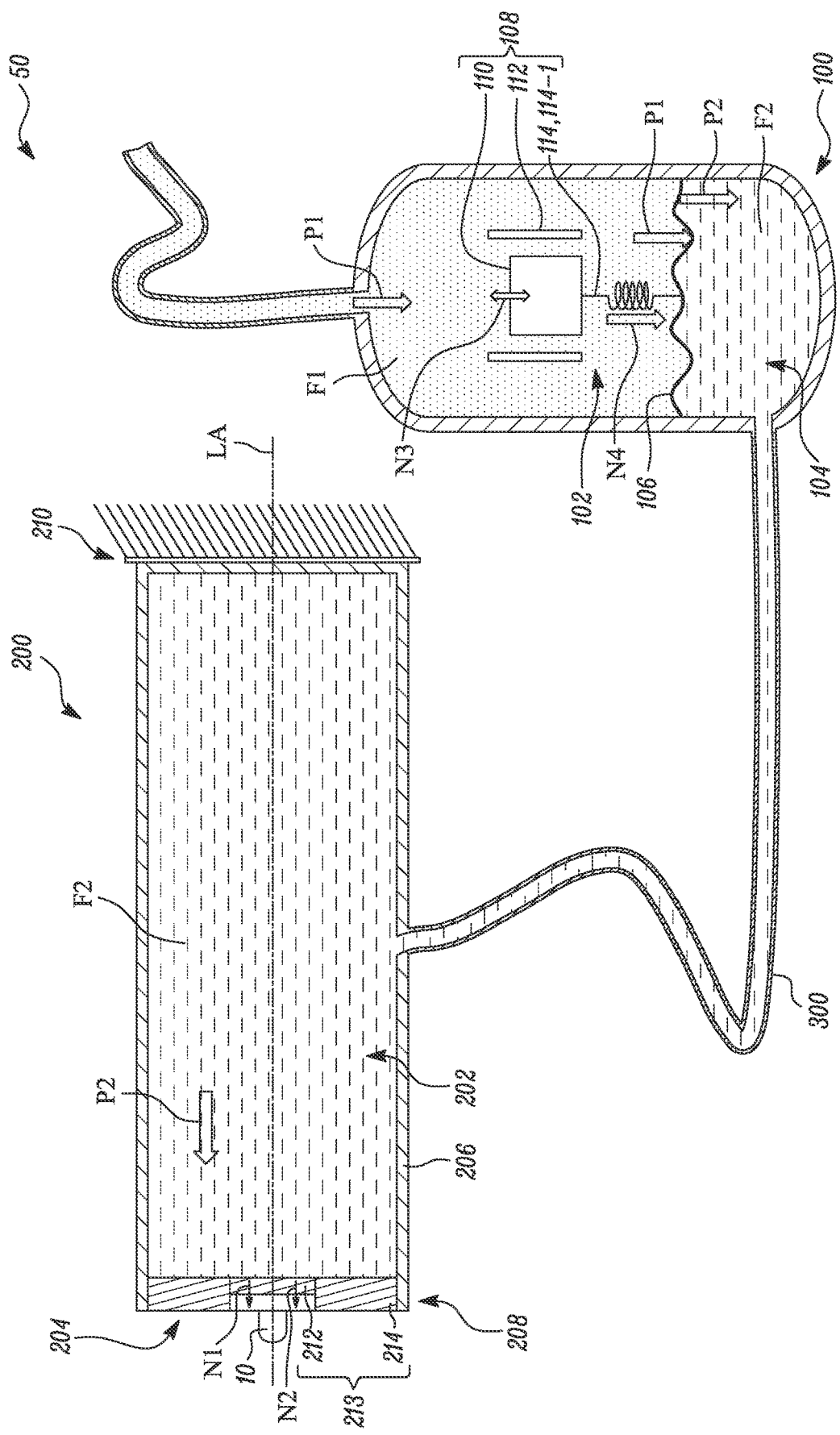
FIG. 1 is a schematic view of a system for testing at least one test piece, according to an embodiment of the present disclosure.

FIG. 1 illustrates a schematic view of a system 50 for testing at least one test piece 10, according to an embodiment of the present disclosure. In some cases, the at least one test piece 10 may be a mechanical component, a joint or a structure. In some cases, the at least one test piece 10 may be a dovetail joint of a fan blade of a gas turbine engine. In some cases, the at least one test piece 10 may be any other mechanical component installed in a gas turbine engine, or other prime movers. The "at least one test piece 10" is interchangeably referred to hereinafter as the "test piece 10".

The system 50 includes a pressure vessel 100. The pressure vessel 100 includes a first chamber 102 receiving a first fluid F1 at a first pressure P1. The pressure vessel 100 further includes a second chamber 104 fluidly separated from the first chamber 102 and receiving a second fluid F2. In some embodiments, the first fluid F1 is a gas, and the second fluid F2 is a hydraulic fluid. The first fluid F1 may be a compressible gas, such as nitrogen, argon, any inert gas, a mixture of gases, and/or the like. The second fluid F2 may be any hydraulic fluid (e.g., a brake fluid). In some cases, the second fluid F2 may be a fluid based on glycol-ether, mineral oil, silicone, etc.

The pressure vessel 100 further includes an actuating membrane 106. The actuating membrane 106 fluidly separates the first chamber 102 from the second chamber 104. The actuating membrane 106 may be of any shape including, but not limited to, circular, rectangular, polygonal, etc. In some embodiments, the shape of the actuating membrane 106 may vary based on a shape and dimensions of the pressure vessel 100. The actuating membrane 106 may include a circumferential portion or edge (not shown) coupled to an internal wall of the pressure vessel 100 through any coupling means. The actuating membrane 106 is configured to apply a second pressure P2 on the second fluid F2 within the second chamber 104 in response to the application of the first pressure P1 by the first fluid F1 on the actuating membrane 106.

The system 50 further includes a test vessel 200 including an internal chamber 202 disposed in fluid communication with the second chamber 104 of the pressure vessel 100. The system 50 further includes a conduit 300 fluidly communicating the second chamber 104 with the internal chamber 202. In some cases, the conduit 300 may be a hose or a duct. In some cases, the conduit 300 may be rigid, or may be flexible. Further, dimensions of the conduit 300 may vary based on application requirements.

The internal chamber 202 is configured to receive the second fluid F2 at the second pressure P2. In some embodiments, the test vessel 200 may include a hydraulic cylinder disposed in fluid communication with the second chamber 104 of the pressure vessel 100. The test vessel 200 further includes at least one test wall 204 defining at least one boundary of the internal chamber 202. The "at least one test wall 204" is interchangeably referred to hereinafter as the "test wall 204". Further, the test vessel 200 includes a first end 208 and a second end 210 opposite to the first end 208.

The test vessel 200 further includes an enclosing wall 206 at least partially defining the internal chamber 202. In some cases, the enclosing wall 206 may include a flange connection (not shown) for coupling the test wall 204 to the enclosing wall 206. The enclosing wall 206 extends between the first end 208 and the second end 210. In some embodiments, the test vessel 200 is closed at the second end 210. In some embodiments, the second end 210 may be rigidly connected to a stationary surface or component. The test vessel 200 may therefore be cantilevered at the second end 210. A length of the enclosing wall 206 extending between the first end 208 and the second end 210 may be based on application requirements. Further, the test vessel 200 extends along a longitudinal axis LA.

The at least one test wall 204 is coupled to the at least one test piece 10. The at least one test wall 204 includes an elastic disc 213 including a central portion 212 and a circumferential portion 214 fixedly coupled to the enclosing wall 206. Specifically, the central portion 212 of the test wall 204 is coupled to the test piece 10. In some embodiments, the test wall 204 may be a deformable wall. In some cases, the elastic disc 213 may be a metallic disc. The circumferential portion 214 may be connected to the enclosing wall 206 through a flange connection (not shown) to fixedly couple the elastic disc 213 to the enclosing wall 206 of the test vessel 200. Further, the central portion 212 may be deformable relative to the circumferential portion 214. In some cases, a thickness of the central portion 212 may be less than a thickness of the circumferential portion 214 to facilitate deformation of the central portion 212.

Further, the at least one test wall 204 is configured to apply a first force N1 on the at least one test piece 10 in response to the application of the second pressure P2 by the second fluid F2 on the at least one test wall 204. In some embodiments, the first force N1 is substantially constant. In other words, the first force N1 may show negligible variation with time. For example, a maximum variation of the first force N1 may be less than or equal to 1% of a desired magnitude. Moreover, the central portion 212 is configured to apply the first force N1 on the test piece 10.

The system 50 further includes an actuator 108 engaged with the actuating membrane 106 of the pressure vessel 100. The actuator 108 includes a mass 110 coupled to the actuating membrane 106. The actuator 108 further includes an electromagnetic actuation device 112 disposed proximal to the mass 110. In some embodiments, the electromagnetic actuation device 112 is a direct current linear actuator. In some cases, the electromagnetic actuation device 112 may include a magnetic field assembly (not shown) and a coil winding (not shown). In some cases, the electromagnetic actuation device 112 may be a voice coil actuator. The actuator 108 further includes a spring 114 coupling the mass 110 to the actuating membrane 106. In the illustrated embodiment of FIG. 1, the spring 114 includes a mechanical spring 114-1, for example, a coil spring.

The electromagnetic actuation device 112 is configured to apply a time-varying actuating force N3 on the mass 110, such that the mass 110 oscillates relative to the pressure vessel 100 to apply a time-varying force N4 on the actuating membrane 106. The electromagnetic actuation device 112 uses a flow of current to oscillate the mass 110 relative to the pressure vessel 100. In other words, the electromagnetic actuation device 112 may provide an energy to excite the mass 110 relative to the pressure vessel 100 to apply the time-varying force N4 on the actuating membrane 106.

In some embodiments, the electromagnetic actuation device 112 is further configured to apply the time-varying actuating force N3 on the mass 110 at a predetermined frequency. In some embodiments, the predetermined frequency is equal to a natural frequency of a combination of the mass 110 and the spring 114. As the predetermined frequency is equal to the natural frequency of the combination of the mass 110 and the spring 114, the mass 110 and the spring 114 may oscillate at resonance. As a result, a relatively small amount of the time-varying actuating force N3 applied on the mass 110 may transform into the time-varying force N4 applied on the actuating membrane 106 along with large displacements of the actuating membrane 106. In some cases, the electromagnetic actuation device 112 (e.g., the voice coil actuator) may apply the time-varying actuating force N3 on the mass 110 at a high frequency.

As stated above, the actuating membrane 106 is configured to apply the second pressure P2 on the second fluid F2 within the second chamber 104 in response to the application of the first pressure P1 by the first fluid F1 on the actuating membrane 106. Therefore, the actuator 108 is configured to apply the time-varying force N4 on the actuating membrane 106 while the first pressure P1 is being applied by the first fluid F1 on the actuating membrane 106.

The at least one test wall 204 is further configured to apply a second force N2 on the at least one test piece 10 in addition to the first force N1 in response to the application of the time-varying force N4 by the actuator 108 on the actuating membrane 106. The second force N2 is time-varying and is different from the first force N1. In some embodiments, the first force N1 may be a high magnitude steady force and the second force N2 may be time-varying force of relatively lower magnitude. The central portion 212 of the test wall 204 is configured to apply the second force N2 on the test piece 10. Therefore, the central portion 212 of the test wall 204 is configured to apply the first force N1 as well as the second force N2 on the test piece 10.

In some embodiments, the second force N2 is an oscillating force having an amplitude. In some embodiments, a magnitude of the first force N1 is greater than the amplitude of the second force N2 by a factor of at least 10. In some embodiments, the magnitude of the first force N1 may vary from about 100 bars to about 1000 bars and the amplitude of the second force N2 may vary from about bars to 100 bars. Further, it should be noted that during the application of the first force N1 and the second force N2 on the test piece 10, the central portion 212 may move relative to the circumferential portion 214 of the elastic disc 213. Specifically, the central portion 212 of the elastic disc 213 applies the first force N1 and the second force N2 on the test piece 10 in a direction along the longitudinal axis LA.

Figure 2:
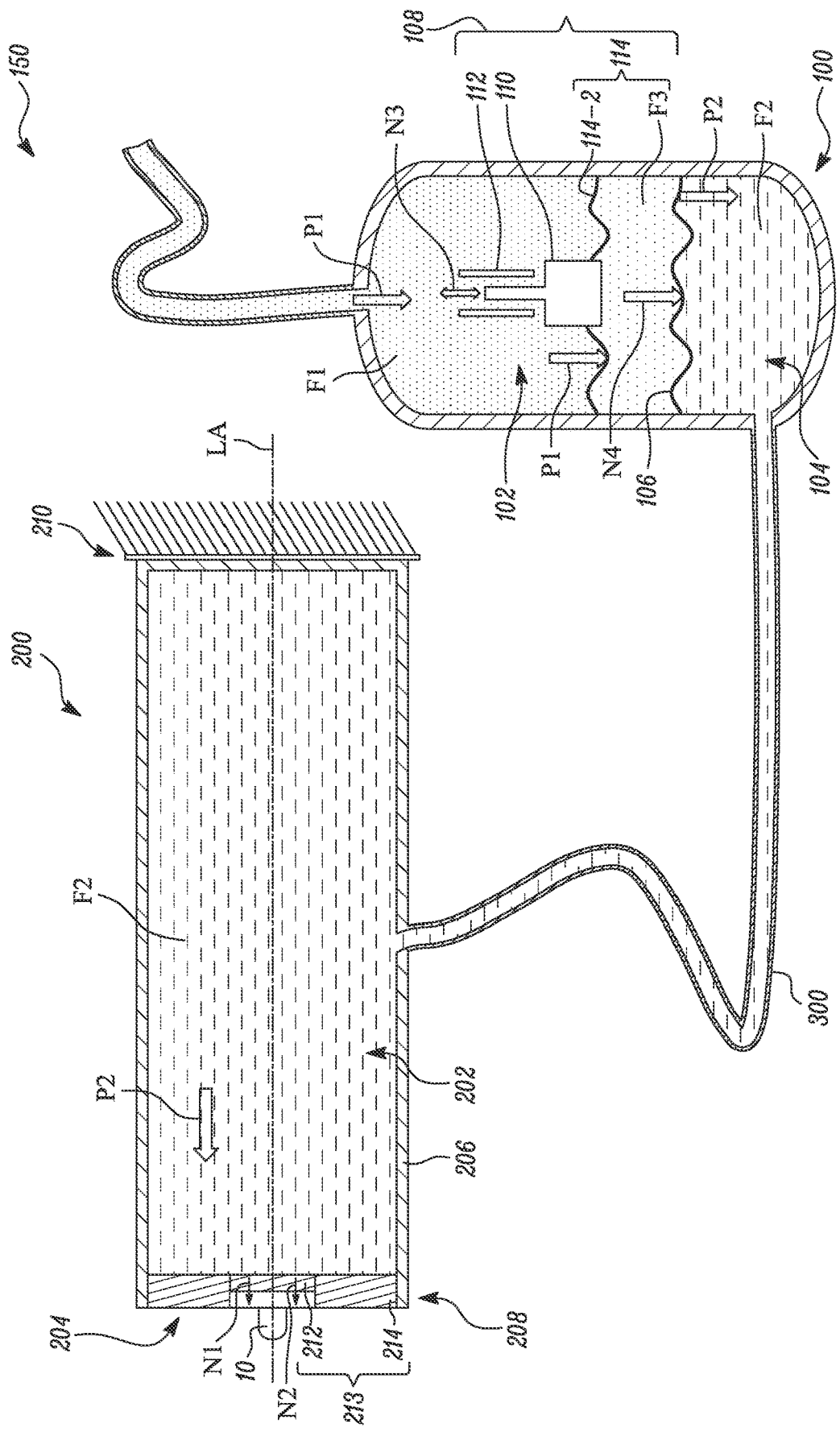
FIG. 2 is a schematic view of a system for testing at least one test piece, according to another embodiment of the present disclosure.

FIG. 2 is a schematic view of a system 150 for testing the at least one test piece 10, according to another embodiment of the present disclosure. The system 150 is substantially similar to the system 50 illustrated in FIG. 1, with common components being referred to by the same reference numerals. However, in the system 150, the spring 114 includes a spring membrane 114-2 (instead of the mechanical spring 114-1 shown in FIG. 1) disposed in the first chamber 102 and an enclosed fluid F3 disposed between the spring membrane 114-2 and the actuating membrane 106. Further, the spring membrane 114-2 is coupled to the mass 110. In some cases, the enclosed fluid F3 may be same as the first fluid F1. The enclosed fluid F3, without limiting the scope of the disclosure, may also be a fluid other than the first fluid F1 and the second fluid F2.

As stated above, the electromagnetic actuation device 112 is configured to apply the time-varying actuating force N3 on the mass 110 at a predetermined frequency, such that the mass 110 oscillates relative to the pressure vessel 100 to apply the time-varying force N4 on the actuating membrane 106. In the illustrated embodiment of FIG. 2, by coupling the spring membrane 114-2 to the mass 110, the time-varying force N4 is applied on the actuating membrane 106 via the enclosed fluid F3 in response to the time-varying actuating force N3 applied on the spring membrane 114-2.

Figure 3:
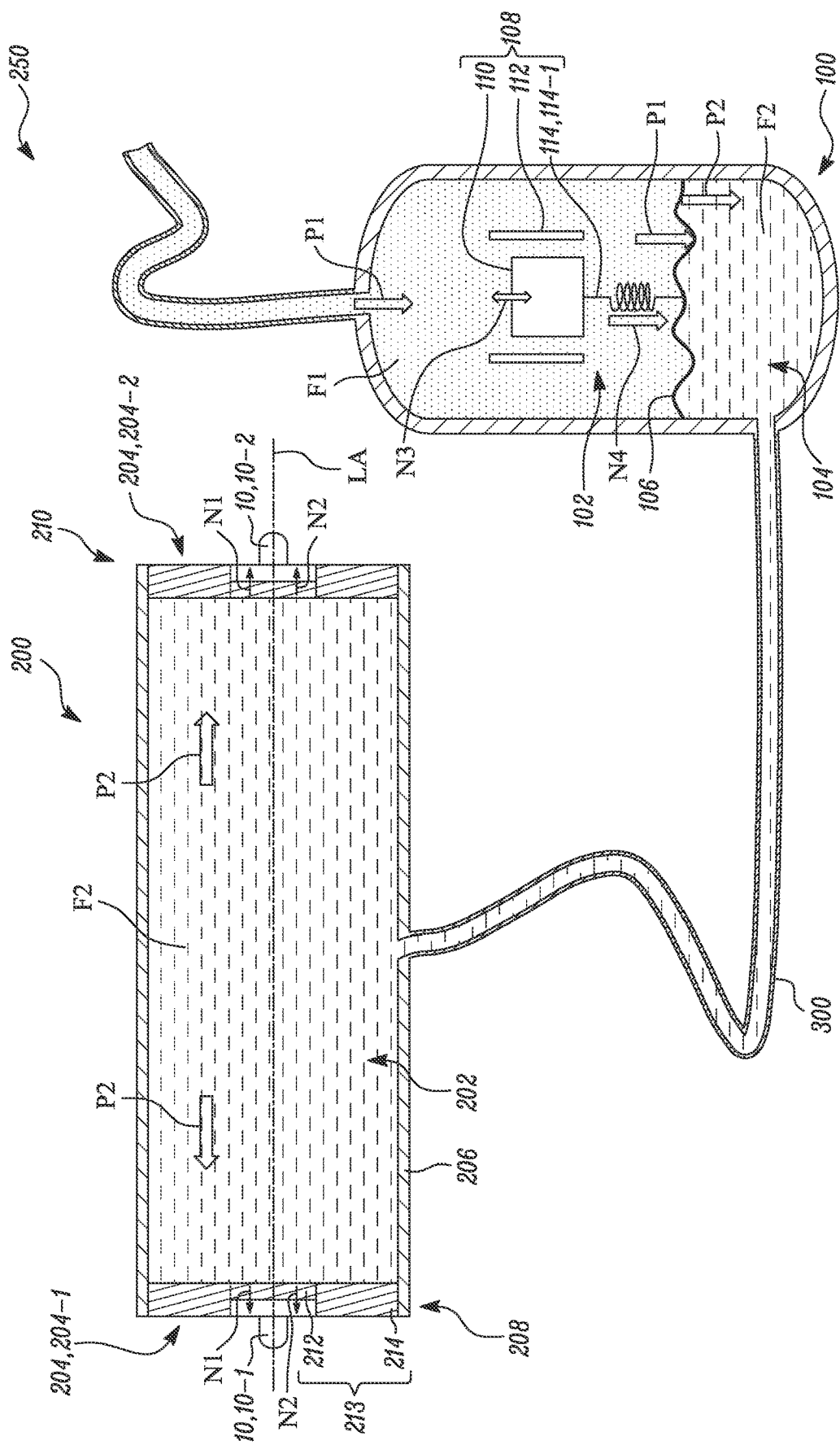
FIG. 3 is a schematic view of a system for testing a first test piece and a second test piece, according to an embodiment of the present disclosure.

FIG. 3 is a schematic view of a system 250 for testing the at least one test piece 10, according to an embodiment of the present disclosure. The system 250 is substantially similar to the system 50 illustrated in FIG. 1, with common components being referred to by the same reference numerals. However, in the system 250, the at least one test piece 10 includes a first test piece 10-1 and a second test piece 10-2. Therefore, in the illustrated embodiment of FIG. 3, the system 250 may be able to test two test pieces (i.e., the first test piece 10-1 and the second test piece 10-2). In some embodiments, the second test piece 10-2 may be substantially similar to the first test piece 10-1. In some other cases, the second test piece 10-2 may be different from the first test piece 10-1.

Referring to FIG. 3, the at least one test wall 204 includes a first test wall 204-1 defining a boundary of the internal chamber 202 at the first end 208 of the test vessel 200. Further, the at least one test wall 204 includes a second test wall 204-2 defining a boundary of the internal chamber 202 at the second end 210 of the test vessel 200. Therefore, in the illustrated embodiment of FIG. 3, the at least one test wall 204 includes two test walls (i.e., the first test wall 204-1 and the second test wall 204-2). In some embodiments, the second test wall 204-2 is substantially similar to the first test wall 204-1. In other embodiments, the second test wall 204-2 may be different from the first test wall 204-1. Further, the second fluid F2 is configured to apply the second pressure P2 on each of the first test wall 204-1 and the second test wall 204-2.

In the illustrated embodiment of FIG. 3, the first test wall 204-1 is coupled to the first test piece 10-1. The second test wall 204-2 is coupled to the second test piece 10-2. The first test wall 204-1 is configured to apply the first force N1 on the first test piece 10-1 in response to the application of the second pressure P2 by the second fluid F2 on the first test wall 204-1. The second test wall 204-2 is configured to apply the first force N1 on the second test piece 10-2 in response to the application of the second pressure P2 by the second fluid F2 on the second test wall 204-2.

The first test wall 204-1 is further configured to apply the second force N2 on the first test piece 10-1 in addition to the first force N1 in response to the application of the time-varying force N4 by the actuator 108 on the actuating membrane 106. The second test wall 204-2 is further configured to apply the second force N2 on the second test piece 10-2 in response to the application of the time-varying force N4 by the actuator 108 on the actuating membrane 106. Therefore, the first test wall 204-1 is configured to apply the first force N1 and the second force N2 on the first test piece 10-1. Further, the second test wall 204-2 is configured to apply the first force N1 and the second force N2 on the second test piece 10-2. Hence, for testing the first test piece 10-1 and the second test piece 10-2, the system 250 is configured to apply the first force N1 and the second force N2 on each of the first test piece 10-1 and the second test piece 10-2.

Figure 4:
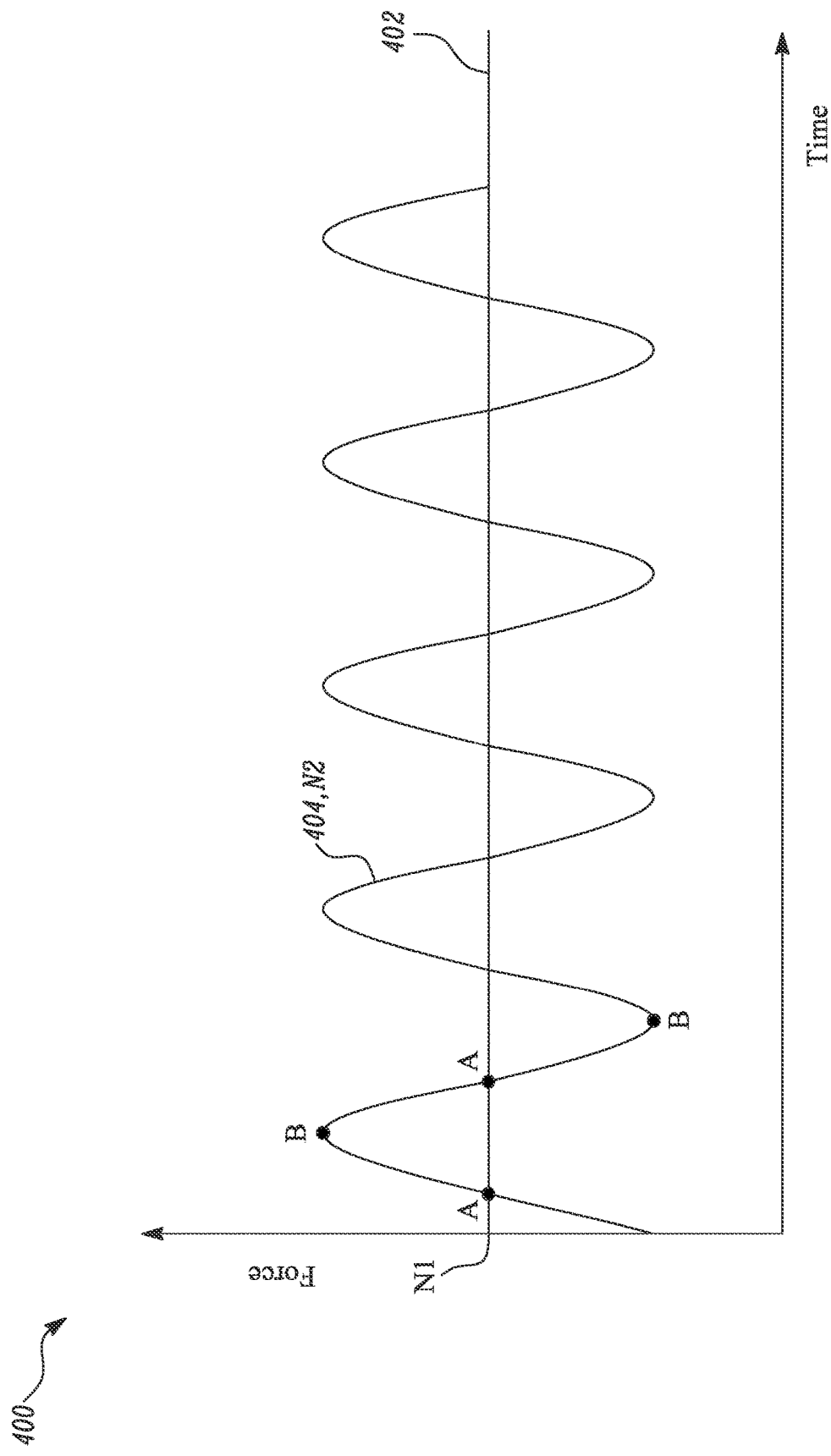
FIG. 4 is an exemplary graph illustrating a first force and a second force applied by at least one test wall on the at least one test piece.

FIG. 4 is an exemplary graph 400 illustrating the first force N1 and the second force N2 applied by the at least one test wall 204 (shown in FIGS. 1-3) on the at least one test piece 10 (shown in FIGS. 1-3). As illustrated in the graph 400, force is depicted in arbitrary units (a.u.) on the ordinate. Time is depicted on the abscissa.

Referring to FIGS. 1 to 4, the graph 400 illustrates a steady line 402 depicting the first force N1 which is substantially constant with respect to time. The first force N1 is applied by the at least one test wall 204 on the at least one test piece in response to the application of the second pressure P2 by the second fluid F2 on the at least one test wall 204.

The graph 400 further illustrates a curve 404 depicting the variation of the second force N2 with respect to time. In some cases, the curve 404 may be a sinusoidal curve. Further, it should be noted that the curve 404 is symmetric with respect to the steady line 402 depicting the first force N1. The second force N2 is applied by the at least one test wall 204 on the at least one test piece 10 in response to the application of the time-varying force N4 by the actuator 108 on the actuating membrane 106. In the illustrated curve 404 of the graph 400, the second force N2 oscillates between higher amplitude points (illustrated by point B) and crosses the low amplitude points (illustrated by point A).

Referring to FIGS. 1 to 4, for testing the at least one test piece 10, each of the systems 50, 150, 250 may apply the first force N1 as well as the second force N2 on the at least one test piece 10. As the first force N1 is applied in response to the application of the second pressure P2 by the second fluid F2 on the at least one test wall 204, the first force N1 may be a steady force (e.g., a hydraulic force). Further, the first force N1 may provide a large steady force required for testing the at least one test piece 10.

Each of the systems 50, 150, 250 is further configured to apply the second force N2 on the at least one test piece 10 in response to the application of the time-varying force N4 by the actuator 108 on the actuating membrane 106. Further, as the second force N4 is applied in response to the application of the time-varying force N4, the second force N2 may be an alternating force required for testing the at least one test piece 10. Hence, each of the systems 50, 150, 250 may be configured to apply the alternating force (i.e., the second force N2) in addition to the steady force (i.e., the first force N1) on the at least one test piece 10 for testing the at least one test piece 10.

Generally, in real time operations involving the use of the at least one test piece 10, the at least one test piece 10 may be subjected to various loads generated by steady forces as well as alternating forces (i.e., time-varying forces). Such forces may correspond to service representative conditions of the at least one test piece 10. Each of the systems 50, 150, 250 may enable the application of the steady force (i.e., the first force N1) as well as the alternating force (i.e., the second force N2) on the at least one test piece 10 for testing a durability and a mechanical integrity of the at least one test piece 10. Hence, each of the systems 50, 150, 250 of the present disclosure may impose the service representative conditions on the at least one test piece 10 by applying the alternating force in addition to the constant fluid force on the at least one test piece 10.

As compared to conventional techniques for testing the mechanical integrity of a test piece by applying only a hydraulic force, each of the systems 50, 150, 250 may utilize a single setup for applying both the steady force (i.e., the first force N1) as well as the alternating force (i.e., the second force N2) in order to test the mechanical integrity of the at least one test piece 10. In other words, each of the systems 50, 150, 250 uses the single setup for generating and imposing the service representative conditions on the at least one test piece 10. Thus, each of the systems 50, 150, 250 may be able to accurately determine the durability and the mechanical integrity of the at least one test piece 10.

Further, as already stated above, the predetermined frequency of the time-varying actuating force N3 applied on the mass 110 is equal to the natural frequency of the combination of the mass 110 and the spring 114. As a result, small oscillations of the mass 110 may transform into a greater value of the time-varying force N4 applied on the actuating membrane 106 along with large displacements of the actuating membrane 106. As compared to a conventional piezo electric actuation system, the actuator 108 of each of the systems 50, 150, 250 may apply the alternating force (i.e., the second force N2) on the at least one test piece 10 with small displacements as well as large displacements of the actuating membrane 106 and/or the at least one test piece 10. The service representative conditions imposed on the at least one test piece 10 may include small displacements as well as large displacements of the at least one test piece 10.

Moreover, by imposing the service representative conditions on the at least one test piece 10, a service life of the at least one test piece 10 may be determined. This may further help in predicting a time for next inspection of the at least one test piece 10 after the at least one test piece 10 is put into service.

Referring again to FIG. 3, the system 250 may be configured to test the mechanical integrity of two test pieces (the first test piece 10-1 and the second test piece 10-2). In other words, the system 250 may impose the service representative conditions on each of the first test piece 10-1 and the second test piece 10-2.

Figure 5:
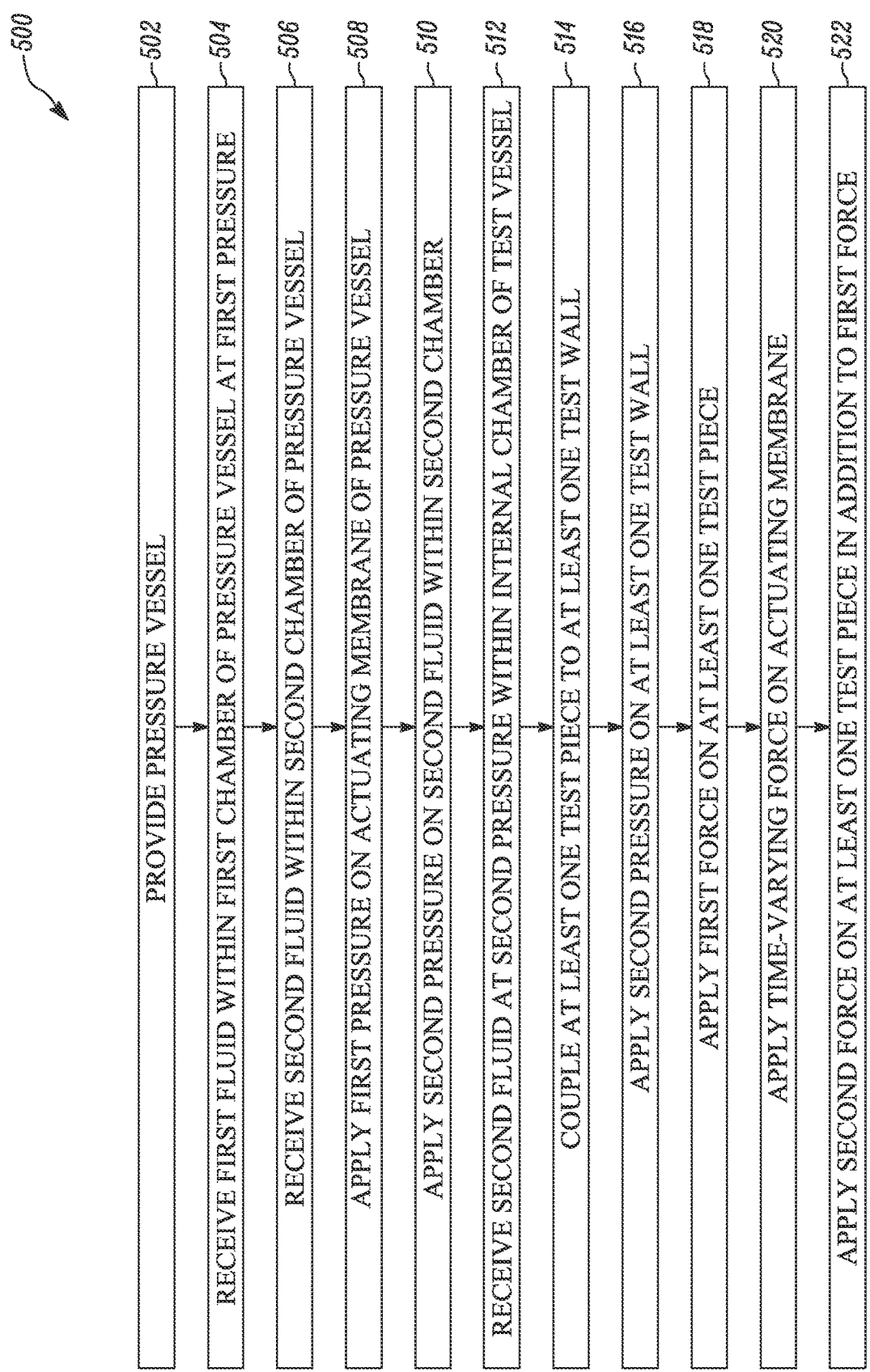
FIG. 5 is a flowchart illustrating a method of testing at least one test piece, according to an embodiment of the present disclosure.

FIG. 5 is a flowchart illustrating a method 500 of testing at least one test piece 10, according to an embodiment of the present disclosure. The method may be implemented using the systems 50, 150, 250 described with reference to FIGS. 1-3. In some embodiments, the at least one test piece 10 includes the first test piece 10-1 and the second test piece 10-2.

Referring to FIGS. 1 to 5, at step 502, the method 500 includes providing the pressure vessel 100. The pressure vessel 100 includes the first chamber 102 and the second chamber 104 fluidly separated from the first chamber 102 by the actuating membrane 106.

At step 504, the method 500 further includes receiving the first fluid F1 within the first chamber 102 at the first pressure P1. At step 506, the method further includes receiving the second fluid F2 within the second chamber 104. At step 508, the method 500 further includes applying the first pressure P1, via the first fluid F1, on the actuating membrane 106. At step 510, the method 500 further includes applying, via the actuating membrane 106, the second pressure P2 on the second fluid F2 within the second chamber 104 in response to the application of the first pressure P1.

At step 512, the method 500 further includes receiving the second fluid F2 at the second pressure P2 within the internal chamber 202 of the test vessel 200. The internal chamber 202 is disposed in fluid communication with the second chamber 104. The test vessel 200 includes at least one test wall 204 defining the at least one boundary of the internal chamber 202. In some embodiments, the at least one test wall 204 includes the elastic disc 213 including the central portion 212. In some embodiments, the at least one test wall 204 includes the first test wall 204-1 defining the boundary of the internal chamber 202 at the first end 208 of the test vessel 200. The at least one test wall 204 further includes the second test wall 204-2 (shown in FIG. 3) opposing the first test wall 204-1 and defining the boundary of the internal chamber 202 at the second end 210 of the test vessel 200.

At step 514, the method 500 further includes coupling the at least one test piece to the at least one test wall 204. In some embodiments, coupling the at least one test piece 10 further includes coupling the first test piece 10-1 to the first test wall 204-1 and coupling the second test piece 10-2 (shown in FIG. 3) to the second test wall 204-2. In some embodiments, coupling the at least one test piece to the at least one test wall 204 further includes coupling the at least one test piece 10 to the central portion 212 of the elastic disc 213.

At step 516, the method 500 further includes applying via the second fluid F2, the second pressure P2 on the at least one test wall 204. In some embodiments, applying the second pressure P2 further includes applying the second pressure P2 on each of the first test wall 204-1 and the second test wall 204-2 (shown in FIG. 3).

At step 518, the method 500 further includes applying via the at least one test wall 204, the first force N1 on the at least one test piece 10 in response to the application of the second pressure P2 on the at least one test wall 204. In some embodiments, the central portion 212 of the elastic disc 213 applies the first force N1 on the at least one test piece 10. Further, in some embodiments, the first test wall 204-1 applies the first force N1 on the first test piece 10-1 and the second test wall 204-2 applies the first force N1 on the second test piece 10-2 (shown in FIG. 3). In some embodiments, the first force N1 is substantially constant.

At step 520, the method 500 further includes applying via the actuator 108, the time-varying force N4 on the actuating membrane 106 while the first pressure P1 is being applied by the first fluid F1 on the actuating membrane 106. In some embodiments, applying the time-varying force N4 on the actuating membrane 106 further includes applying via the electromagnetic actuation device 112, the time-varying actuating force N3 on the mass 110 coupled to the actuating membrane 106. In some embodiments, the method 500 further includes coupling via the spring 114, the mass 110 to the actuating membrane 106. In some embodiments, the time-varying actuating force N3 is applied on the mass 110 at the predetermined frequency. In some embodiments, the predetermined frequency is equal to the natural frequency of the combination of the mass 110 and the spring 114. In some embodiments, applying the time-varying force N4 on the actuating membrane 106 further includes oscillating the mass 110 relative to the pressure vessel 100 to apply the time-varying force N4 on the actuating membrane 106.

At step 522, the method 500 further includes applying, via the at least one test wall 204, the second force N2 on the at least one test piece 10 in addition to the first force N1 in response to the application of the time-varying force N4 on the actuating membrane 106. The second force N2 is time-varying and is different from the first force N1. In some embodiments, the central portion 212 of the elastic disc 213 applies the second force N2 on the at least one test piece 10.

In some embodiments, the first test wall 204-1 applies the second force N2 on the first test piece 10-1 and the second test wall 204-2 applies the second force N2 on the second test piece 10-2. In some embodiments, the second force N2 is the oscillating force having the amplitude. The magnitude of the first force N1 is greater than the amplitude of the second force N2 by a factor of at least 10.

It will be understood that the present disclosure is not limited to the embodiments above described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A system for testing at least one test piece, the system comprising:
    a pressure vessel comprising:
        a first chamber receiving a first fluid (F1) at a first pressure (P1);
        a second chamber fluidly separated from the first chamber and receiving a second fluid (F2); and
        an actuating membrane fluidly separating the first chamber from the second chamber, wherein the actuating membrane is configured to apply a second pressure (P2) on the second fluid (F2) within the second chamber in response to the application of the first pressure (P1) by the first fluid (F1) on the actuating membrane;
    a test vessel comprising an internal chamber disposed in fluid communication with the second chamber and at least one test wall defining at least one boundary of the internal chamber, wherein the at least one test wall is coupled to the at least one test piece, wherein the internal chamber is configured to receive the second fluid (F2) at the second pressure (P2), and wherein the at least one test wall is configured to apply a first force (N1) on the at least one test piece in response to the application of the second pressure (P2) by the second fluid (F2) on the at least one test wall; and
    an actuator engaged with the actuating membrane and configured to apply a time-varying force (N4) on the actuating membrane while the first pressure (P1) is being applied by the first fluid (F1) on the actuating membrane,
    wherein the at least one test wall is further configured to apply a second force (N2) on the at least one test piece in addition to the first force (N1) in response to the application of the time-varying force (N4) by the actuator on the actuating membrane, and wherein the second force (N2) is time-varying and is different from the first force (N1).

2. The system of claim 1, wherein the actuator comprises:
    a mass coupled to the actuating membrane; and
    an electromagnetic actuation device disposed proximal to the mass and configured to apply a time-varying actuating force (N3) on the mass, such that the mass oscillates relative to the pressure vessel to apply the time-varying force (N4) on the actuating membrane.

3. The system of claim 2, wherein the actuator further comprises a spring coupling the mass to the actuating membrane.

4. The system of claim 3, wherein the spring comprises a spring membrane disposed in the first chamber and an enclosed fluid (F3) disposed between the spring membrane and the actuating membrane, and wherein the spring membrane is coupled to the mass.

5. The system of claim 3, wherein the electromagnetic actuation device is further configured to apply the time-varying actuating force (N3) on the mass at a predetermined frequency, and wherein the predetermined frequency is equal to a natural frequency of a combination of the mass and the spring.

6. The system of claim 1, wherein the first fluid (F1) is a gas, and wherein the second fluid (F2) is a hydraulic fluid.

7. The system of claim 1, wherein the test vessel further comprises an enclosing wall at least partially defining the internal chamber, wherein the at least one test wall comprises an elastic disc comprising a central portion and a circumferential portion fixedly coupled to the enclosing wall, and wherein the central portion is coupled to the at least one test piece and is configured to apply the first force (N1) and the second force (N2) on the at least one test piece.

8. The system of claim 7, wherein the test vessel comprises a first end and a second end opposite to the first end, and wherein the enclosing wall extends between the first end and the second end.

9. The system of claim 8, wherein the at least one test wall comprises a first test wall defining a boundary of the internal chamber at the first end of the test vessel and a second test wall opposing the first test wall and defining a boundary of the internal chamber at the second end of the test vessel, and wherein the second fluid (F2) is configured to apply the second pressure (P2) on each of the first test wall and the second test wall.

10. The system of claim 9, wherein the at least one test piece comprises a first test piece and a second test piece, wherein the first test wall is coupled to the first test piece and configured to apply the first force (N1) and the second force (N2) on the first test piece, and wherein the second test wall is coupled to the second test piece and configured to apply the first force (N1) and the second force (N2) on the second test piece.

11. The system of claim 1, wherein the second force (N2) is an oscillating force having an amplitude, and wherein a magnitude of the first force (N1) is greater than the amplitude of the second force (N2) by a factor of at least 10.

12. The system of claim 1, further comprising a conduit fluidly communicating the second chamber with the internal chamber.

13. A method of testing at least one test piece, the method comprising:
providing a pressure vessel, the pressure vessel comprising a first chamber and a second chamber fluidly separated from the first chamber by an actuating membrane;
receiving a first fluid (F1) within the first chamber at a first pressure (P1);
receiving a second fluid (F2) within the second chamber;
applying a first pressure (P1), via the first fluid (F1), on the actuating membrane;
applying, via the actuating membrane, a second pressure (P2) on the second fluid (F2) within the second chamber in response to the application of the first pressure (P1);
receiving the second fluid (F2) at the second pressure (P2) within an internal chamber of a test vessel, the internal chamber being disposed in fluid communication with the second chamber, wherein the test vessel comprises at least one test wall defining at least one boundary of the internal chamber;

coupling the at least one test piece to the at least one test wall;
applying, via the second fluid (F2), the second pressure (P2) on the at least one test wall;
applying, via the at least one test wall, a first force (N1) on the at least one test piece in response to the application of the second pressure (P2) on the at least one test wall;
applying, via an actuator, a time-varying force (N4) on the actuating membrane while the first pressure (P1) is being applied by the first fluid (F1) on the actuating membrane; and
applying, via the at least one test wall, a second force (N2) on the at least one test piece in addition to the first force (N1) in response to the application of the time-varying force (N4) on the actuating membrane, wherein the second force (N2) is time-varying and is different from the first force (N1).

14. The method of claim 13, wherein applying the time-varying force (N4) on the actuating membrane further comprises:
applying, via an electromagnetic actuation device, a time-varying actuating force (N3) on a mass coupled to the actuating membrane; and
oscillating the mass relative to the pressure vessel to apply the time-varying force (N4) on the actuating membrane.

15. The method of claim 14, further comprising coupling, via a spring, the mass to the actuating membrane, wherein the time-varying actuating force (N3) is applied on the mass at a predetermined frequency, and wherein the predetermined frequency is equal to a natural frequency of a combination of the mass and the spring.

16. The method of claim 13, wherein the at least one test wall comprises an elastic disc comprising a central portion, and wherein coupling the at least one test piece to the at least one test wall further comprises coupling the at least one test piece to the central portion of the elastic disc, such that the central portion of the elastic disc applies the first force (N1) and the second force (N2) on the at least one test piece.

17. The method of claim 13, wherein the at least one test wall comprises a first test wall defining a boundary of the internal chamber at a first end of the test vessel and a second test wall opposing the first test wall and defining a boundary of the internal chamber at a second end of the test vessel, and wherein applying the second pressure (P2) further comprises applying the second pressure (P2) on each of the first test wall and the second test wall.

18. The method of claim 13, wherein the at least one test piece comprises a first test piece and a second test piece, and wherein coupling the at least one test piece further comprises:
coupling the first test piece to the first test wall, such that the first test wall applies the first force (N1) and the second force (N2) on the first test piece; and
coupling the second test piece to the second test wall, such that the second test wall applies the first force (N1) and the second force (N2) on the second test piece.

19. The method of claim 13, wherein the first force (N1) is substantially constant.

20. The method of claim 13, wherein the second force (N2) is an oscillating force having an amplitude, and wherein a magnitude of the first force (N1) is greater than the amplitude of the second force (N2) by a factor of at least 10.

* * * * *